United States Patent Office 3,203,922
Patented Aug. 31, 1965

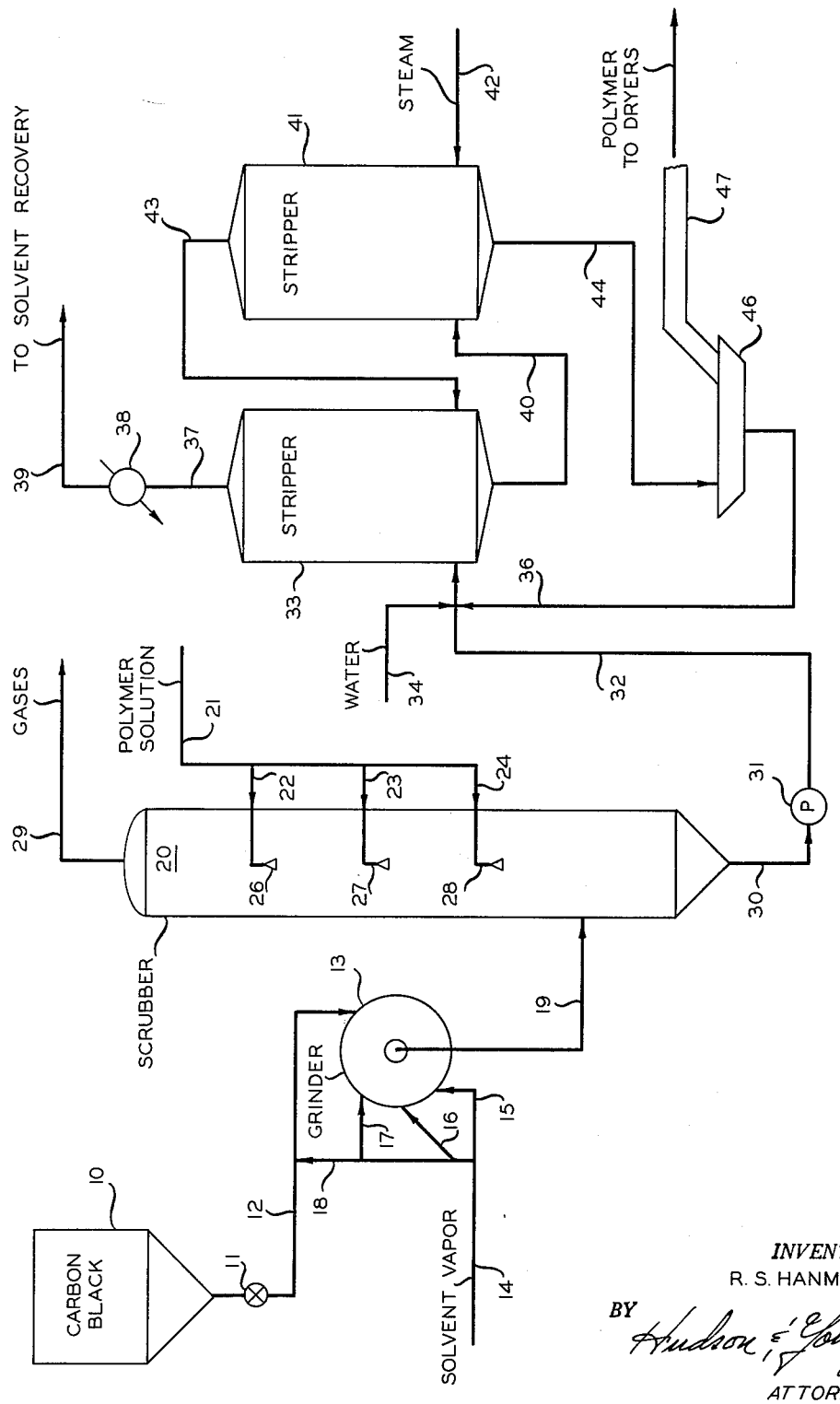

3,203,922
PRODUCTION OF POLYMER-CARBON
BLACK MASTERBATCH
Robert S. Hanmer, Bartlesville, Okla., assignor to Phillips
Petroleum Company, a corporation of Delaware
Filed Jan. 23, 1961, Ser. No. 84,435
9 Claims. (Cl. 260—41.5)

This invention relates to a method of preparing polymer-carbon black masterbatches. In another aspect it relates to a method of incorporating carbon black into solution polymers.

The copending application of P. F. Rion, Serial No. 27,535, filed May 9, 1960, discusses the advantages of incorporating carbon black into solution polymers before they are coagulated and dried. The production of black masterbatches by dispersion of carbon black in a latex from an emulsion polymerization process and thereafter coagulating the polymer is well known and widely practiced in the rubber industry. These rubber-carbon black masterbatches are convenient for rubber fabricators to use and constitute a significant segment of the rubber market. It has been found that carbon black can be incorporated in the rubbery polymers prepared by solution polymerization to give intimate dispersion of the black in the rubber. This invention relates to an improved method of dispersing carbon black into polymer solutions in order to provide very uniform black masterbatch crumbs.

According to my invention a procedure is provided for incorporating carbon black into a polymer which comprises forming a mixture of carbon black with an organic solvent vapor, condensing the solvent vapor on the carbon black by contacting the mixture with a liquid organic solvent, forming a dispersion of this carbon black in a polymer solution, and thereafter coagulating the polymer to form a polymer-carbon black masterbatch crumb. Preferably the mixture of the carbon black and solvent vapor is formed in a fluid energy mill where the velocity of the injected vapor is employed to disintegrate the carbon black pellets. The vapor in the resulting mixture can be condensed by contacting the mixture either with a liquid hydrocarbon solvent or a solution of polymer in hydrocarbon solvent. The latter procedure is preferred because it eliminates the step of subsequently mixing a solvent-carbon black dispersion with a polymer solution.

It is an object of my invention to provide a method of producing polymer-carbon black masterbatches. Another object of my invention is to provide an improved process for dispersing carbon black in a rubbery solution polymer. Still another object is to provide a carbon black materbatching process wherein carbon black pellets are disintegrated and the resulting finely divided black is conveyed by superheated solvent vapor which is then condensed by polymer solution to provide uniform dispersions of carbon black in the coagulated polymer. Other objects, and advantages and features of my invention will be apparent to those skilled in the art from the following disclosure.

The process of this invention can be advantageously employed to incorporate carbon black into any type of polymeric material which can be dissolved in organic solvent, for example, normally solid polymers of 1-olefins. The invention has particular utility, however, in the incorporation of carbon black into rubbery polymers of conjugated dienes having from 4 to 12 carbon atoms per molecule, said polymers having been prepared in solution polymerization in the presence of heterogeneous initiator systems. Examples of the conjugated dienes which can be used in the preparation of these rubbery polymers include 1,3-butadiene, isoprene, 2,3-dimethylbutadiene, 2-methoxybutadiene, 1,3-hexadiene, 1,3-octadiene, 1,3-decadiene, 2-phenyl-1,3-butadiene, and the like. These conjugated dienes can be polymerized alone or in admixture with each other and/or with one or more other copolymerizable compounds containing an active vinylidene group. Suitable comonomers include styrene, acrylonitrile, methylacrylate, methylmethacrylate, vinyl chloride, methyl vinyl ether, ethylene, propylene, 1-butene, 1-propene, 1-octene, and the like. Examples of catalyst systems which can be used to prepare rubbery polymers in solution are the organometallic catalysts such as a combination of alkylaluminum and titanium halide, for example, triisobutylaluminum and titanium tetraiodide or a combination of triisobutylaluminum, titanium tetraiodide, and titanium tetrachloride, or triisobutylaluminum, titanium tetrachloride and iodine; organolithium or similar catalyst systems; and the alkali metal catalyst. Various other well known catalysts can be employed to prepare solution polymers of conjugated dienes.

Solutions of the above-described polymers are mixed with the carbon black after the carbon black has been dispersed in organic solvent vapor. Any solvent which is compatible with that in which the polymer is dissolved is suitable. Preferably the organic solvent is an aliphatic, cycloaliphatic or aromatic hydrocarbon solvent which is normally liquid under standard conditions. Suitable solvents include pentane, hexane, n-octane, isooctane, cyclooctane, cyclohexane, methylcyclohexane, benzene, toluene, and the like.

Any carbon black normally used for compounding with rubbery or resinous polymers can be employed in this process. In general the high abrasion furnace blacks are preferred because of their superior reinforcing properties for rubber.

The invention is now described in connection with the drawing. Pelleted carbon black is removed from storage hopper 10 via star valve 11 or some equivalent metering or weighing facility. The carbon black is passed through conduit 12 to fluid energy mill 15. Fluid energy or jet mills are described in Perry's Chemical Engineers' Handbook, 3rd edition (1950), McGraw-Hill, N.Y., and any type can be used provided the mill is equipped to discharge the gas and pulverized material together. Superheated solvent vapors in conduit 14 are introduced to mill 13 via ducts 15, 16 and 17. A portion of the superheated vapor is passed through conduit 18 to conduit 12 where it is mixed with pelleted carbon black and helps convey this black into the grinder. The superheated solvent vapor is introduced into the grinder at high velocity and the force of the entering vapor provides the energy for disintegrating the pellets. Pelleted carbon black is generally retained on a 15-mesh screen and after passing through mill 13 the black is approximately its original particle size. About 99 percent of the black should pass through a 200-mesh screen.

The weight ratio of the superheated vapor to carbon black in the grinder is ordinarily at least about 3 to 1 although somewhat lower ratios can sometimes be employed. I prefer to operate with a ratio of about 5 parts by weight of vapor to 1 part of carbon black. While there is no actual upper limit on the amount of vapor that can be used, from a practical standpoint the vapor does not exceed 20 parts by weight per part of carbon black. A mixture of superheated vapor and finely divided carbon black is passed from grinder 13, through conduit 19 into scrubber 20.

A relatively cool polymer solution is introduced to scrubbing tower 20 through conduit 21 which divides into conduits 22, 23 and 24 to feed spray nozzles 26, 27 and 28, respectively. The solvent vapor introduced via conduit 19 is cooled and condensed in tower 20 by the polymer solution. As the vapor condenses it wets the carbon black particles. Carbon black particles thus wetted with a hydrocarbon solvent show considerably less tendency toward agglomeration than black particles wetted with water. Wetting the black with solvent in this manner improves the dispersion of the black in the polymer solution. Also, excellent contact can be obtained in tower 20 between the polymer solution and the incoming black.

Air or other uncondensable gases are vented from the top of quench tower 20 via conduit 29. The condensed solvent vapor dilutes the polymer solution improving the fluidity of the resulting dispersion of carbon black in the solution. This dispersion is removed from tower 20 through condit 30 and is passed by pump 31 through conduit 32 to steam stripping chamber 33.

Fresh water is added to the dispersion in conduit 32 through conduit 34 and recycle water is also injected through conduit 36. The mixture of water and polymer solution containing carbon black is sprayed into stripping chamber 33 wherein solvent and water are evaporated. The vapors are passed overhead through conduit 37 and condensed in heat exchanger 38. The condensate, which is a mixture of water and solvent, is passed through conduit 39 to solvent recovery operations not shown.

In steam stripping zone 33 a portion of the polymer is precipitated from solution and the resulting slurry is passed from chamber 33 by way of conduit 40 to a second stripping chamber 41. Fresh steam is injected into this chamber via conduit 42 and vapors of solvent and water removed from the slurry are passed overhead through conduit 43 and into the bottom of stripping chamber 33, thereby providing the heat necessary for solvent evaporation in this chamber. Substantially all of the hydrocarbon solvent is removed in this manner leaving a water slurry of polymer coagulum which has retained the thoroughly dispersed carbon black. This slurry of coagulum is removed from chamber 41 and passed through conduit 44 to shaker screen 46 where the water is removed from the masterbatch crumb. The wet crumb is removed from the shaker screen via conveyor 47 and the water is recycled to the steam stripping operation by way of conduit 36. The wet masterbatch crumb is passed by conveyor 47 to extruders or drying operations not shown.

For the superheated vapors used in grinder 13 it is preferred to use the same type of solvent which is employed to form the solution of polymer which is introduced as the scrubbing liquid in tower 20. In this manner recycle problems are simplified since there is no need to make a separation of the hydrocarbon solvents.

The concentration of the polymer in the solution depends upon the molecular weight of the polymer but for most normally solid rubbery polymers a concentration of about 2 to 20 weight percent of polymer in the solution is desirable. Preferably the concentration is in the range of about 5 to 15 weight percent. The concentration should be as high as possible and still obtain satisfactory scrubbing conditions in tower 20. If the viscosity of the polymer solution becomes too high, there is poor contact between the solution and the mixture of carbon black and superheated vapor. On the other hand, overly dilute solutions require additional evaporation to remove the excess solvent. It is, however, within the scope of my invention to use solvent only as the scrubbing liquid in tower 20. In this manner a dispersion of carbon black in liquid hydrocarbon solvent is produced. This dispersion is then mixed with polymer solution in an intermediate operation, not shown, between tower 20 and chamber 33. As stated above, I prefer to use polymer solution as the scrubbing liquid in order to eliminate this mixing step.

While a fluid energy or jet mill is a highly efficient and presently preferred instrument for forming the solvent vapor-carbon black stream, any type of apparatus which will grind the pelleted black and provide a black-solvent vapor mixture can be used. If loose or fluff black is available the grinder can be replaced by a simple jet or similar suitable mixing device for dispersing the black and the superheated vapor. It is important, however, that a thorough mixing of the carbon black and the vapor be obtained prior to introducing the black and solvent into the scrubbing tower. A feature of this invention is that a high degree of dispersion of the black in the superheated solvent is maintained up to the quenching step and the dispersion of the black in the polymer solution is thereby facilitated. As pointed out above, the use of the hydrocarbon carrier is the grinding step aids in preventing coalescence of the black.

The carbon black-polymer solution readily forms a discrete crumb in the steam strippers without the use of a surface active agent or crumb parting agent. This crumb is stripped of residual solvent in the second stripping zone. Similarly the draining operation in which the residual water is removed from the crumb is facilitated because of the better handling characteristics of the crumb containing the dispersed carbon black.

In the preparation of the masterbatches of carbon black and rubbery polymer of conjugated dienes, normally a black content between about 30 and 80 parts by weight per 100 parts of rubbery solids is employed. Preferably the black content of the rubber masterbatch is about 40 to 70 parts per 100 parts of polymer.

An advantage of masterbatching polybutadine having a cis content greater than 90 percent according to the process of this invention lies in its effect upon the cold flow of the polymer. The raw rubber containing no carbon black is difficult to package in a manner such that problems of cold flow are not encountered in shipping or storage. When satisfactorily masterbatched with carbon black, the crumb can be baled or packaged in the conventional manner and no cold flow is apparent. Also, tread stocks prepared from these masterbatches are frequently more scorch resistant and also more resistant to abrasion than similar stocks prepared by incorporating the carbon black on the mill. When the process of this invention is employed the over-all properties of the rubber are as good or better than those obtained when the carbon black is incorporated on the mill.

In order to further illustrate my invention the following example is presented. In this example the conditions and proportions are presented as being typical only and should not be construed to limit my invention unduly.

*Example*

A typical run is made according to the process shown in the drawing. In this run, 3,000 pounds per hour of HAF carbon black pellets are fed to a fluid energy mill (Jet-O-Mizer). In the vapor feed line 22,500 pounds per hour of toluene vapor at 450° F. and about 10 p.s.i.g. is introduced, about 25 percent of the vapor being introduced in the carbon black feed, the remainder directed to the grinding nozzles. Temperature of the effluent from the grinding zone is about 404° F. This effluent is transferred directly to a quench tower as shown. A stream of cis-polybutadiene in toluene (8 percent solution) is introduced at 75,000 pounds per hour into the tower through spray nozzles situated ⅓, ½ and ⅔ of the way up the tower from the base. Temperature of the polymer solution is 50° F. The polymer has a cis content of 95.5 percent and a vinyl content of 3.5 percent, the remainder of the unsaturation being in trans-configuration. The Mooney value of the polymer is 43 (ML–4 at 212° F.).

The quenched carbon black-polymer-toluene stream leaves the tower at a temperature of 180° F. as a 9 percent solids mixture. Water from the feed line and the recycle stream is mixed with the stream as it enters the first stripping zone at a rate to maintain a reasonable level in both vessels to assure proper contact of the polymer-carbon black mixture with steam. Steam is introduced into the second stripper at 36,700 pounds per hour. Temperature in the first zone is 190° F. and in the second zone is 210° F. Toluene is removed overhead from the first zone at 91,500 pounds per hour, leaving a crumb containing about 10 to 15 percent toluene to be transferred to the second stripper in which the remaining toluene is removed.

The polymer-carbon black crumb is transferred from the second stripping zone to the separating screen. From this separating step the crumb containing about 30 percent water is removed to a 3-pass apron dryer operated at 180–200° F. where it is dried at the rate of 4,500 pounds (dry polymer) per hour. The dried masterbatch is then baled in 90-pound bales and stacked for shipment. No cold flow is observed in a storage period of 30 days.

As will be apparent to those skilled in the art from the above disclosure, various modifications can be made in my invention without departing from the spirit or scope thereof.

I claim:

1. A method of incorporating carbon black into a polymer which comprises forming a mixture of carbon black and vapor of organic liquid which is a solvent for said polymer, wetting said black by condensing solvent vapor on said black by contacting said mixture with organic liquid which is a solvent for said polymer, thereafter forming a dispersion of said black thus wetted in polymer solution, and coagulating said polymer.

2. A method of incorporating carbon black into a solution polymer which comprises forming a mixture of finely divided carbon black and vapor of a normally liquid hydrocarbon which is a solvent for said polymer, wetting said black by contacting said mixture with liquid hydrocarbon which is a solvent for said polymer thereby condensing said vapor, forming a dispersion of said carbon black thus wetted in a solution of said polymer in liquid hydrocarbon solvent, and coagulating said polymer in the presence of said dispersion to obtain polymer containing carbon black.

3. A method of incorporating carbon black into a solution polymer which comprises forming a mixture of finely divided carbon black and vapor of a normally liquid hydrocarbon which is a solvent for said polymer, contacting said mixture with liquid hydrocarbon which is a solvent for said polymer thereby condensing said vapor and forming a dispersion of carbon black in liquid hydrocarbon solvent, mixing said dispersion of carbon black in liquid hydrocarbon solvent with a solution of normally solid polymer in liquid hydrocarbon solvent, and coagulating said polymer in the presence of said dispersion to obtain polymer containing carbon black.

4. A method of incorporating carbon black into a solution polymer which comprises forming a mixture of finely divided carbon black and vapor of a normally liquid hydrocarbon which is a solvent for said polymer, contacting said mixture with a solution of polymer in liquid hydrocarbon solvent thereby condensing said vapor and forming a dispersion of carbon black in said solution, and coagulating said polymer in the presence of said dispersion to obtain polymer containing carbon black.

5. A method of incorporating carbon black into a solution polymer which comprises grinding carbon black in the presence of superheated vapors of a hydrocarbon liquid which is a solvent for said polymer thereby forming a stream of said superheated vapors carrying said carbon black, contacting said stream with a solution of polymer in normally liquid hydrocarbon solvent thereby condensing said vapors and forming a dispersion of carbon black in said polymer solution, and coagulating said polymer in the presence of said dispersion to obtain polymer containing carbon black.

6. A method of incorporating carbon black into a solution polymer which comprises grinding carbon black in the presence of high velocity superheated vapors of a normally liquid hydrocarbon which is a solvent for said polymer thereby forming a stream of superheated hydrocarbon vapors carrying said carbon black, passing said stream to a contacting zone wherein said vapors and carbon black are contacted with polymer solution in a liquid hydrocarbon solvent thereby condensing said vapors and dispersing said black in said solution, adding water to the resulting dispersion, steam stripping the solvent from the resulting water-dispersion mixture thereby coagulating polymer, and recovering polymer containing carbon black.

7. A process according to claim 6 wherein said hydrocarbon solvent is toluene and said polymer is rubbery cis-polybutadiene having a cis-content above 90 percent.

8. A method of incorporating carbon black into a solution polymer which comprises passing pelleted carbon black together with superheated vapor of normally liquid hydrocarbon which is a solvent for said polymer in a ratio of at least 3 parts by weight of solvent to 1 part of black to a fluid energy mill, grinding said pelleted carbon black in the presence of high velocity hydrocarbon vapors, passing a resulting stream of hydrocarbon vapor carrying carbon black from said mill to a vapor-liquid contacting zone, contacting said vapor and carbon black with a 2 to 20 weight percent solution of rubbery polymer of conjugated diene containing from 4 to 12 carbon atoms per molecule in a normally liquid hydrocarbon solvent thereby forming a dispersion of carbon black in polymer solution, adding water to said dispersion, steam stripping hydrocarbon solvent from the resulting water-dispersion mixture thereby coagulating said rubbery polymer, and recovering a rubbery polymer crumb containing from 30 to 80 parts by weight of carbon black per 100 parts of polymer.

9. The method according to claim 8 wherein said carbon black is a high abrasion furnace black, said hydrocarbon solvent is toluene, and said polymer is polybutadiene having a cis content above 90 percent.

References Cited by the Examiner

UNITED STATES PATENTS

| | | | |
|---|---|---|---|
| 2,762,790 | 9/56 | Greene | 260—41.5 |
| 2,769,795 | 11/56 | Braendle | 260—41.5 |
| 2,821,515 | 1/58 | Jaros | 260—33.6 |
| 2,955,097 | 10/60 | White | 260—41.5 |
| 3,055,856 | 9/62 | Sutherland | 260—41.5 |

FOREIGN PATENTS 158,769    9/54    Australia.

MORRIS LIEBMAN, *Primary Examiner.*

DANIEL ARNOLD, *Examiner.*